(12) United States Patent
Ou

(10) Patent No.: US 8,639,660 B1
(45) Date of Patent: Jan. 28, 2014

(54) METHOD AND APPARATUS FOR CREATING A DATABASE REPLICA

(75) Inventor: Pu Ou, San Luis Obispo, CA (US)

(73) Assignee: Symantec Operating Corporation, Mountain View, CA (US)

(*) Notice: Subject to any disclaimer, the term of this patent is extended or adjusted under 35 U.S.C. 154(b) by 1404 days.

(21) Appl. No.: 11/200,712

(22) Filed: Aug. 10, 2005

(51) Int. Cl.
*G06F 17/30* (2006.01)

(52) U.S. Cl.
USPC .......................................................... 707/625

(58) Field of Classification Search
USPC .................................................. 707/625, 648
See application file for complete search history.

(56) References Cited

U.S. PATENT DOCUMENTS

| | | | | |
|---|---|---|---|---|
| 5,765,171 A * | 6/1998 | Gehani et al. | ............ | 707/203 |
| 5,991,771 A * | 11/1999 | Falls et al. | ............ | 707/202 |
| 6,192,365 B1 * | 2/2001 | Draper et al. | ............ | 707/101 |
| 6,304,882 B1 * | 10/2001 | Strellis et al. | ............ | 707/202 |
| 6,782,399 B2 * | 8/2004 | Mosher, Jr. | ............ | 707/200 |
| 6,889,333 B2 * | 5/2005 | Lawrence et al. | ............ | 713/400 |
| 7,065,538 B2 * | 6/2006 | Aronoff et al. | ............ | 707/202 |
| 7,072,911 B1 * | 7/2006 | Doman et al. | ............ | 707/201 |
| 7,194,486 B2 * | 3/2007 | Ishikawa et al. | ............ | 707/200 |
| 7,287,043 B2 * | 10/2007 | Lindsay et al. | ............ | 707/200 |
| 2004/0010487 A1 | 1/2004 | Prahlad et al. | | |
| 2004/0193655 A1 * | 9/2004 | Miyata et al. | ............ | 707/200 |
| 2004/0250033 A1 | 12/2004 | Prahlad et al. | | |
| 2005/0015436 A1 * | 1/2005 | Singh et al. | ............ | 709/203 |
| 2005/0114285 A1 * | 5/2005 | Cincotta | ............ | 707/1 |
| 2005/0262158 A1 * | 11/2005 | Sauermann | ............ | 707/200 |
| 2005/0278385 A1 * | 12/2005 | Sutela et al. | ............ | 707/200 |
| 2006/0041598 A1 * | 2/2006 | Yamaguchi et al. | ............ | 707/200 |
| 2006/0053304 A1 | 3/2006 | Fries et al. | | |

OTHER PUBLICATIONS

U.S. Appl. No. 11/291,021, filed Nov. 30, 2005, Ou, Pu.

* cited by examiner

*Primary Examiner* — Joshua Bullock
(74) *Attorney, Agent, or Firm* — Campbell Stephenson LLP

(57) ABSTRACT

A method and apparatus for creating a database replica comprising receiving database information from a source server to create a database replica on a target server. The target server subsequently receives at least one set of update data (e.g., a transaction log) from the source server. Lastly, the target server modifies the database replica in accordance to changes detailed in the at least one set of said update data.

20 Claims, 2 Drawing Sheets

METHOD AND APPARATUS FOR CREATING A DATABASE REPLICA

BACKGROUND OF THE INVENTION

1. Field of the Invention

Embodiments of the present invention generally relate to server networks and, more particularly, to creating a replica database in a target server.

2. Description of the Related Art

In an effort to protect computer data from catastrophic failure of a computer or storage volume, data has traditionally been backed up from a primary storage device to a secondary storage device. The backup process and, when needed, the restoration process can be time consuming. In modern computing environments, failure of a computer or storage system requires an instantaneous transition to the backed up data. Transactions cannot be stopped to wait for a restoration process. As such, redundant critical systems are used that contain replicated data.

A primary system (referred to herein as a source server), for example, a database system, will copy its data to a redundant system (referred to herein as a target server). Sometimes such copying is performed on a transaction by transaction basis. Consequently, failure of the source server will cause an instantaneous transition to the target server. Since the source server and the target server are identical or nearly identical, a user would not know that a transition has occurred.

Traditional replication operations are capable of duplicating, for example, a database file or volume at a binary level. Specifically, modifications to a source server database are made at a binary level and are subsequently replicated to a target server. One disadvantage associated with this technique is that there are no assurances that all of the data residing in a target server database is a reliable representation of the database existing on the source server. Notably, the database in the source server may become corrupted and ultimately replicated to the target server, thus compromising the integrity of the targeted database as well. Although there are programs that exist that attempt to repair a corrupted database, these utilities are not completely reliable. Furthermore, when database repair utilities are applied to large databases, the repair process can require an excessive amount of time, e.g., a 50 GB database may require eight hours to repair.

Thus, there is a need in the art for a more reliable method and apparatus for producing an uncorrupted database replica.

SUMMARY OF THE INVENTION

A method and apparatus for creating a database replica is described. The method includes receiving database information from a source server used to create a database replica on a target server. The target server subsequently receives at least one set of update data (e.g., a transaction log) from the source server. Lastly, the target server modifies the database replica in accordance to changes detailed in the at least one set of said update data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not intended to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
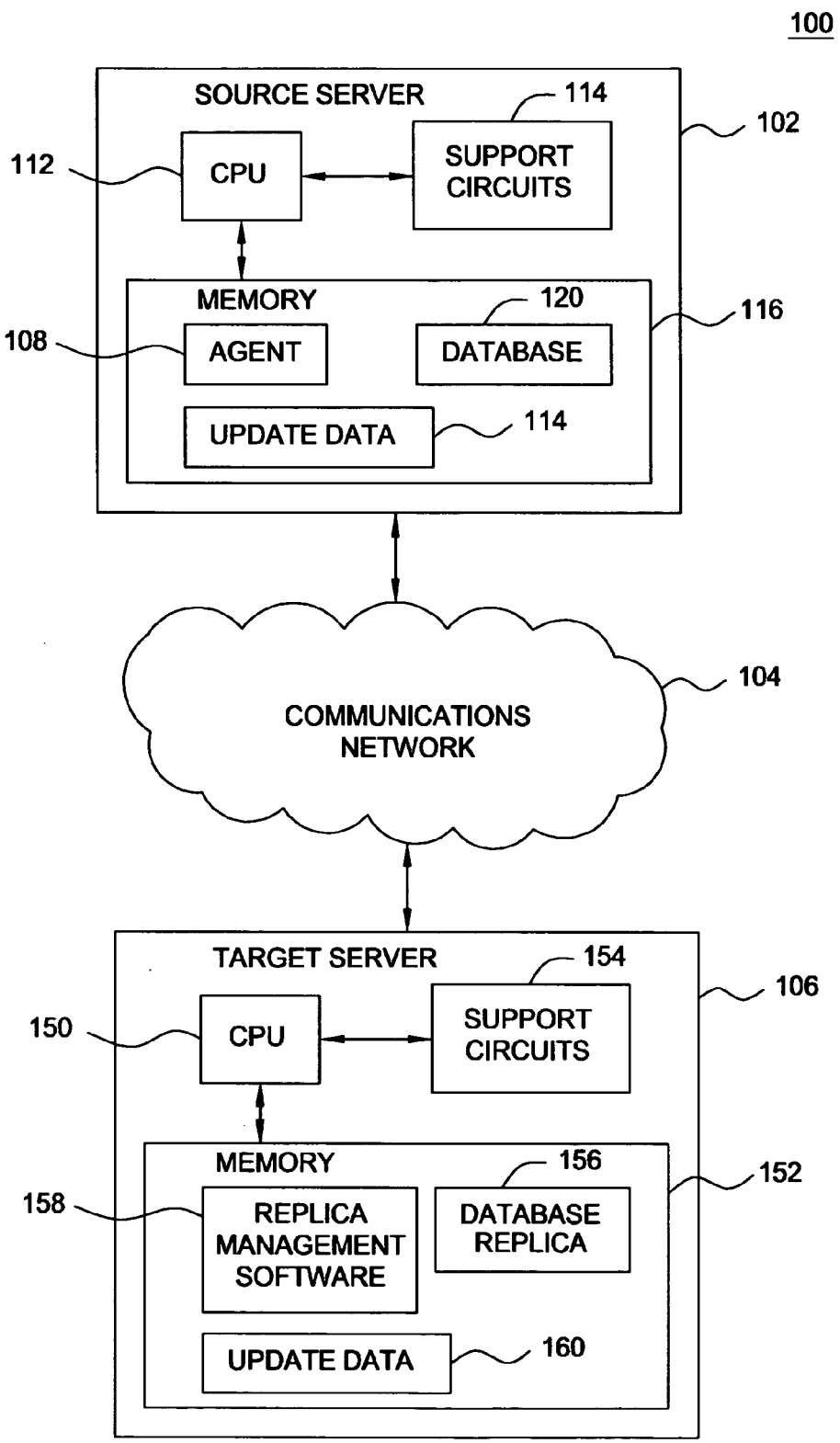
FIG. 1 depicts a server network in which one embodiment of the invention may be utilized.

FIG. 1 illustrates a server network 100 in which one embodiment of the present invention may be utilized. The computer network 100 comprises a source server 102 that is connected to a target server 106 via a communications network 104. The communications network 104 may be any conventional network, such as an Ethernet network or a fiber channel network. For the sake of simplicity, only one source server 102 and one target server 106 are shown. Those skilled in the art will understand that a plurality of source servers and/or a plurality of target servers may be connected together via the communications network 104 to form a larger network.

The source server 102 may be any type of computer or device on the network that manages backup resources for replication operations. In one embodiment, the source server 102 is dedicated to the support of and providing MICROSOFT Exchange in a network environment. The source server 102 comprises at least one central processing unit (CPU) 112, support circuits 114, and memory 116. The CPU 112 may comprise one or more conventionally available microprocessors and/or microcontrollers. The support circuits 114 are well known circuits that are used to support the operation of the CPU 112. These circuits comprise power supplies, clocks, input/output interface circuitry, cache and the like.

Memory 116 may comprise random access memory, read only memory, removable disk memory, flash memory, optical storage and various combinations of these types of memory. The memory 116 is sometimes referred to as main memory and may in part be used as cache memory or buffer memory. The memory 116 stores various forms of software and files, such as a replication agent 108, at least one database 120, and a collection of update data 114. The replication agent 108 is responsible for synchronizing the source server database 120 with the target server database 156 (e.g., provide a copy of the database to the target server in accordance with one embodiment of the invention). Additionally, the agent 108 tracks the changes to the database such that those changes are sent to the target server 106 in accordance with the present invention, as described below.

The database 120 may comprise any information store volume or file that contains data. In one embodiment, the database 120 is a MICROSOFT Exchange information store volume containing various pages of Exchange data, including Mailbox and Public Folder information. Each page of Exchange data is typically 4 kilobytes in size. The collection of update data 114 stored in the memory 116 is a collection of transaction and changes the source server needs to make to the database. Before a change is actually made to the database, the change is recorded and initially becomes part of the collection of update data 114. In one embodiment, this collection of update data 114 is referred to as a transaction log or logs associated with the Exchange application. These transaction logs, which are 5 Megabytes in size, record the modifications that are to be made to an Exchange database 120. Specifically, in the event a change to the Exchange database is to be made (e.g., an Exchange account receiving an email that ultimately needs to be written into the inbox), the modifications are first made to a transaction log. Thus, the transaction logs contain all the modifications that have been or will be made to the database 120. The database 120 is not actually modified until a predefined or set amount of data is added or changed, or alternatively, until a predefined time period has elapsed. In another embodiment, the modifications contained in the transaction logs may be immediately written to the database 120 at the instruction of a user, network administrator, or other entity. As is described below, the invention takes advantage of these transaction logs to improve database replication.

The target server 106 comprises at least one central processing unit (CPU) 150, support circuits 154, and memory 152. The CPU 150 may comprise one or more conventionally available microprocessors and/or microcontrollers. The support circuits 114 are well known circuits that support the CPU 150. These circuits comprise power supplies, clocks, input/output interface circuitry, cache and the like.

Memory 152 may comprise random access memory, read only memory, removable disk memory, flash memory, optical memory and various combinations of these types of memory. The memory 152 is sometimes referred to as main memory and may in part be used as cache memory or buffer memory. The memory 152 stores various software and files, such as update data 160, and a database replica 156, and a replica management software engine 158. The update data 160 comprises the update data 114 received from the source server 102 and, for example, may comprise Exchange transaction logs.

The replica management engine 158 is an application that is responsible for managing the replication operations on the target server 106. Notably, the management engine 158 is responsible for configuring the target server 106 to receive the synchronization and/or update data 114 from the source server 102. During the synchronization process, the engine 158 may compare the checksum (derived from the first 4 bytes in a page header) of every page in the source database against the checksum in the corresponding page in the target database 156. More specifically, before a page is written into the database 156 during the synchronization process, a mathematical algorithm is executed by the engine 158 using the first 4 bytes of the header of each page to produce a checksum. If the checksums on two corresponding pages (which respectively reside in the target server database 156 and the source server database 120) differ, then the Exchange application will know that the page on the source server must be copied to the replica database 156.

After initial synchronization of the databases 120 and 156, the transaction logs, or any other type of update data 114, are used to update a database replica 156 on the target server 106.

As transactions and modifications intended for the database 120 are being made to the transaction log 114, these same transactions are being replicated and immediately transferred (in, for example, 5 MB increments) to the corresponding transaction log 160 located on the target server 106. The agent 108 transfers the transaction log information to the target server 106. Once the transaction log 160 is obtained by the target server 106, it may be used to update the database replica 156 in a manner described below.

The replica management engine 158 determines when the replicated update data 160 on the target server 106 is "played to" (i.e., data written/recorded to database replica) the database replica 156. More specifically, the engine 158 may be configured to have the update data 160 written to the database replica 156 i) every time the target server 106 receives update data from the source server 102, ii) after a predefined amount of update data is received from the source server (e.g., write data to database after 50 Megabytes of data is received), or iii) after a predefined period of time has elapsed (e.g., write data to database every 4 hours). Consequently, this feature effectively provides a safeguard for the target server 106. Notably, the target server 106 may always be "rolled forward" using the update data 160, but cannot be "rolled back" once data is written.

Consider the scenario in which the current time is 11:00 AM and the target server database 156 represents a complete copy of the source server database 120 as it existed at 8:00 AM (i.e., when it was last updated). The source server database 120 was subsequently determined to have been corrupted at 10:00 AM due to infected data. Consequently, this corrupted data would also exist in the transaction log 160 that was provided to the target server 106. However, because the transaction log copies 160 were not immediately written to the database replica 156 (due to a time delay configuration), the database replica 156 is not corrupted despite the fact the target server 106 collectively possesses all of the data contained on the source server 102. Instead, the target server 106 may be accordingly "rolled forward" to the point at which the database 120 became corrupted. Specifically, the uncorrupted data collected up to 10:00 AM is safely written to the database replica without fear of file corruption. The target server database will therefore contain the most up-to-date, yet uncorrupted, version of the database. More importantly, the database replica 156 may then be used to restore the corrupted source server database 120, or the target server 106 may be used as a replacement for the source server 102.

Figure 2:
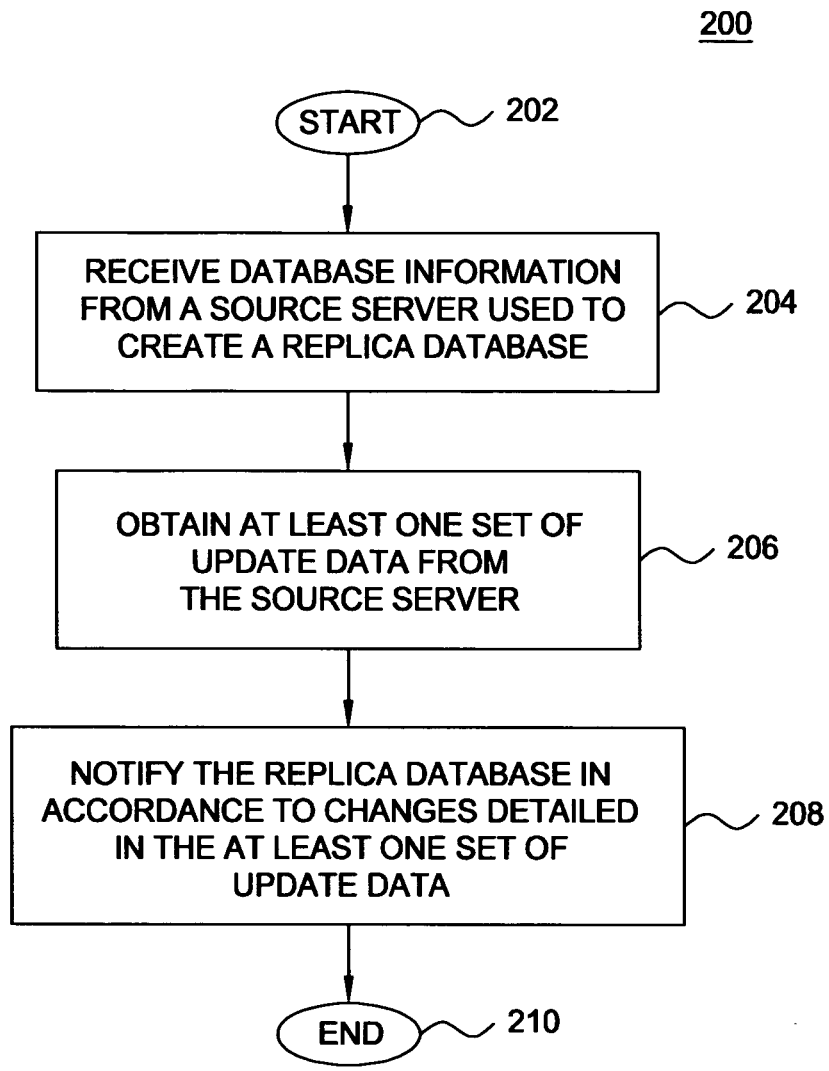
FIG. 2 depicts a flow diagram of a method of creating a database replica in accordance with another embodiment of the invention.

FIG. 2 illustrates a flow diagram of a method 200 for creating a database replica in accordance with one embodiment of the invention. This method 200 may be initiated on a periodic basis or predefined schedule by the replica management software engine 158. The method 200 starts at step 202 and proceeds to step 204 where a target server 106 receives database information from a source server 102. This database information may be used to create a replica of the source server database 120 on the target server 106.

In one embodiment, the database 120 is initially "synchronized" with the database on the target server 106. Typically, a complete version of the database must be copied (e.g., a snapshot of the database is taken) as a whole to create the initial database replica 156, i.e., the target server 106 does not have a database. However, in instances where a database replica 156 exists on the target server 106 and the original database 120 is considerably large (e.g., 100 GB), network resources may be conserved by synchronizing the databases in a piecemeal fashion. Specifically, using a simple synchronization process, synchronization may be accomplished by comparing the database checksum associated with the page header of each page in the source server database 156 against the checksum associated with the corresponding page in the target server database 156. The pages stored in the target database that demonstrate differences with the pages residing in the source server database (as indicated by differing checksums) are subsequently replaced by the more up to date pages from source server database 120. Notably, if the source server database 120 is larger than the target server database 156, then the excess extra pages are transferred from the source server 102 to the database replica 156. Conversely, if the target server database 156 is larger than the source server database 120, then the extra pages stored in the database replica 156 are deleted from the target server 106. The result is database 156 is identical to database 120 at one particular instant in time.

Other techniques for performing synchronization may be used to ensure that the initial source and replica databases are identical. In connection with the present invention, any form of synchronization can be used.

At step 206, the target server 106 obtains at least one set update data from the source server 102. In one embodiment, a set of update data comprises at least a transaction log, e.g., a 5 MB transaction log. Once the 5 MB of binary data "fills" the transaction log, the update data is replicated and transferred from the source server to the target server. More specifically, the agent 108, e.g., a Veritas Replication Exec (VRE) application, may be utilized to replicate the changes that are made to transaction logs existing in the source server and transmit these transaction logs to the target server 106.

At step 208, the target server 106 modifies the database replica 156 in accordance to the changes detailed in the update data. In one embodiment, an Exchange utility such as eseutiL.exe is used to write the transaction logs to the database replica 156 on the target server 106, i.e., eseutil.exe plays the transaction logs to the database 156. Depending on the embodiment, the data contained in the transaction logs 160 may be written to the database 156 as soon as it is received by the target server 106, on a periodic basis, or after a certain amount of update data is received by the target server 106. The method 200 continues to step 210 and ends.

While the foregoing is directed to embodiments of the present invention, other and further embodiments of the invention may be devised without departing from the basic scope thereof, and the scope thereof is determined by the claims that follow.

The invention claimed is:

1. A method comprising:
   creating a database replica, wherein
      the database replica is stored by a target server;
   synchronizing the database replica with a source database, wherein
      the source database is stored by a source server;
   receiving update data from the source server, wherein
      the update data is received at the target server,
      the update data comprises one or more transactions,
      the one or more transactions are recorded in the update data prior to the one or more transactions being applied to the source database, and
      the one or more transactions are applied to the source database in response to at least one of
         determining that a predefined amount of data has been added to the update data, or
         determining that a predefined time period has elapsed; and
   modifying the database replica in accordance with the one or more transactions, in response to at least one of
      determining that a second predefined amount of update data has been received, or
      determining that a second predefined time period has elapsed.

2. The method of claim 1, wherein the update data comprises at least one transaction log.

3. The method of claim 1, wherein the source server comprises a MICROSOFT Exchange server.

4. The method of claim 1, wherein
   the synchronizing comprises creating a snapshot of the source database.

5. The method of claim 1, wherein
   the synchronizing comprises calculating a checksum for at least one page of the source database.

6. The method of claim 1, wherein
   the modifying is executed on a predefined periodic basis.

7. The method of claim 1, wherein
   said modifying is executed in response to detecting that the update data exceeds a predefined amount of data.

8. An apparatus comprising:
   one or more processors; and
   a memory coupled to the one or more processors, wherein
      the memory stores program instructions executable by the one or more processors to
   create a database replica, wherein
      the database replica is stored by a target server,
   synchronize the database replica with a source database, wherein
      the source database is stored by a source server,
   receive update data from the source server, wherein
      the update data is received at the target server,
      the update data comprises one or more transactions,
      the one or more transactions are recorded in the update data prior to the one or more transactions being applied to the source database, and
      the one or more transactions are applied to the source database in response to at least one of
         determining that a predefined amount of data has been added to the update data, or
         determining that a predefined time period has elapsed, and
   modify the database replica in accordance with the one or more transactions, in response to at least one of
      determining that a second predefined amount of update data has been received, or
      determining that a second predefined time period has elapsed.

9. The apparatus of claim 8, wherein
   the update data comprises at least one transaction log.

10. The apparatus of claim 8, wherein
    said source server comprises a MICROSOFT Exchange server.

11. The apparatus of claim 8, wherein the program instructions are further executable to create a snapshot of the source database.

12. The apparatus of claim 8, wherein
    the synchronizing comprises calculating a checksum for at least one page of the source database.

13. The apparatus of claim 8, wherein
    said database replica is modified on a predefined periodic basis.

14. The apparatus of claim 8, wherein the program instructions are further executable to modify the database replica in response to detecting that the update data exceeds a predefined amount of data.

15. A non-transitory computer readable storage medium storing program instructions executable to:
    create a database replica, wherein
       the database replica is stored by a target server;

synchronize the database replica with a source database, wherein
the source database is stored by a source server;
receive update data from the source server, wherein
the update data is received at the target server,
the update data comprises one or more transactions,
the one or more transactions are recorded in the update data prior to the one or more transactions being applied to the source database, and
the one or more transactions are applied to the source database in response to at least one of
determining that a predefined amount of data has been added to the update data, or
determining that a predefined time period has elapsed; and
modify the database replica in accordance with the one or more transactions, in response to at least one of
determining that a second predefined amount of update data has been received, or
determining that a second predefined time period has elapsed.

16. The non-transitory computer readable storage medium of claim 15, wherein
the update data comprises at least one transaction log.

17. The non-transitory computer readable storage medium of claim 15, wherein said source server comprises a MICROSOFT Exchange server.

18. The non-transitory computer readable storage medium of claim 15, wherein
synchronizing the database replica comprises creating a snapshot of the source database.

19. The non-transitory computer readable storage medium of claim 15, wherein
synchronizing the database replica comprises calculating a checksum for at least one page of the source database.

20. The non-transitory computer readable storage medium of claim 15, wherein
said database replica is modified on a predefined periodic basis.

* * * * *